R. W. ROSE.
MOTOR TREADMILL APPARATUS.
APPLICATION FILED FEB. 23, 1917.

1,294,539.

Patented Feb. 18, 1919.

Inventor
Robert W. Rose
By James R. Hodder
Atty.

UNITED STATES PATENT OFFICE.

ROBERT W. ROSE, OF MARBLEHEAD, MASSACHUSETTS.

MOTOR TREADMILL APPARATUS.

1,294,539.

Specification of Letters Patent. Patented Feb. 18, 1919.

Application filed February 23, 1917. Serial No. 150,318.

*To all whom it may concern:*

Be it known that I, ROBERT W. ROSE, a citizen of the United States, and resident of Marblehead, in the county of Essex and State of Massachusetts, have invented an Improvement in Motor Treadmill Apparatus, of which the following description, in connection with the accompanying drawings, is a specification, like letters on the drawing representing like parts.

My present invention is an apparatus adapted to take power from the rear wheels of an automobile and apply the same to a power transmission mechanism, by an extremely simple, efficient and economical structure which simultaneously lifts the auto wheels from the ground and applies a driving pressure between the wheels and the drive pulleys of the transmission apparatus.

In prior devices of this kind it has been necessary to use jacks, levers, or the like, to raise the auto wheels and then either to use the weight of the rear wheels or employ separate devices to create the friction sufficient to drive the power transmission mechanism from the auto wheels. These prior devices were expensive, complex, and unsatisfactory, particularly in operation with a light weight automobile, since the weight of the rear wheels and power of a small car was insufficient to give suitable driving friction.

My present apparatus obviates the difficulties above noted, and enables a perfect friction contact drive to be secured between the rear wheels and the pulleys of the power transmission device, irrespective of the weight of the car and all by a single movement.

Referring to the drawings illustrating a preferred embodiment of the invention,

Figure 1:
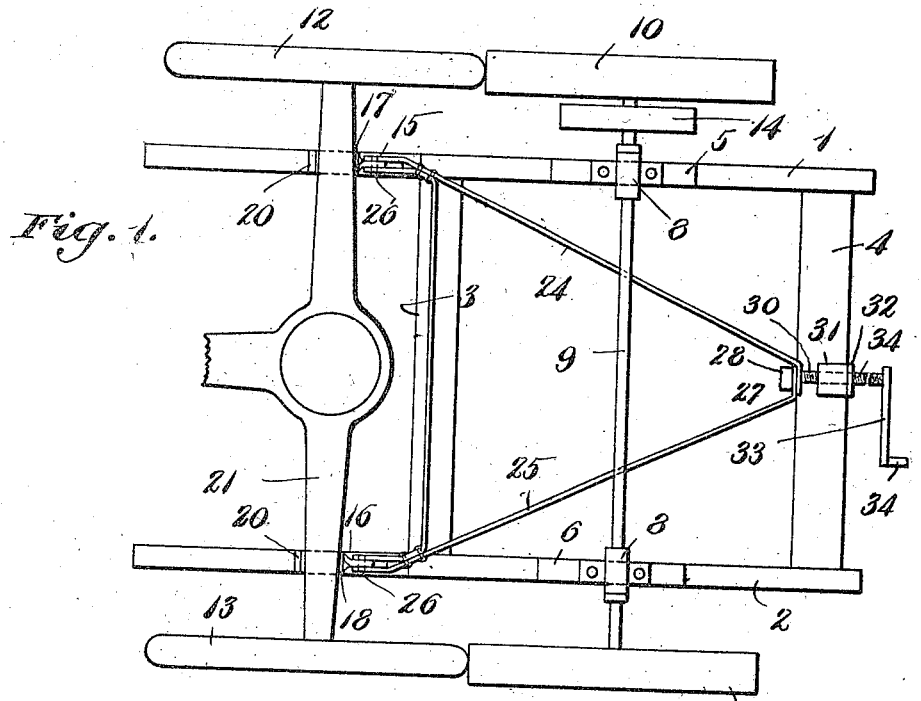
Figure 1 is a plan view of my apparatus showing the rear wheels of an auto, in fragmentary form, and in driving position.

My apparatus comprises a frame consisting in the side supports 1 and 2, and crossbars 3 and 4, giving a firm foundation, to which foundation blocks 5 and 6 are secured, having journal bearings 7 and 8 for a shaft 9, to which are keyed pulleys 10 and 11 in spaced position to fit against the rear wheels 12 and 13 of an automobile. Keyed also on the shaft 9 is a pulley 14, from which a belt leads to the particular machine, such as a buzz saw, hoisting drum, pump, concrete mixer, dynamo, or the like, to supply power.

Figure 2:
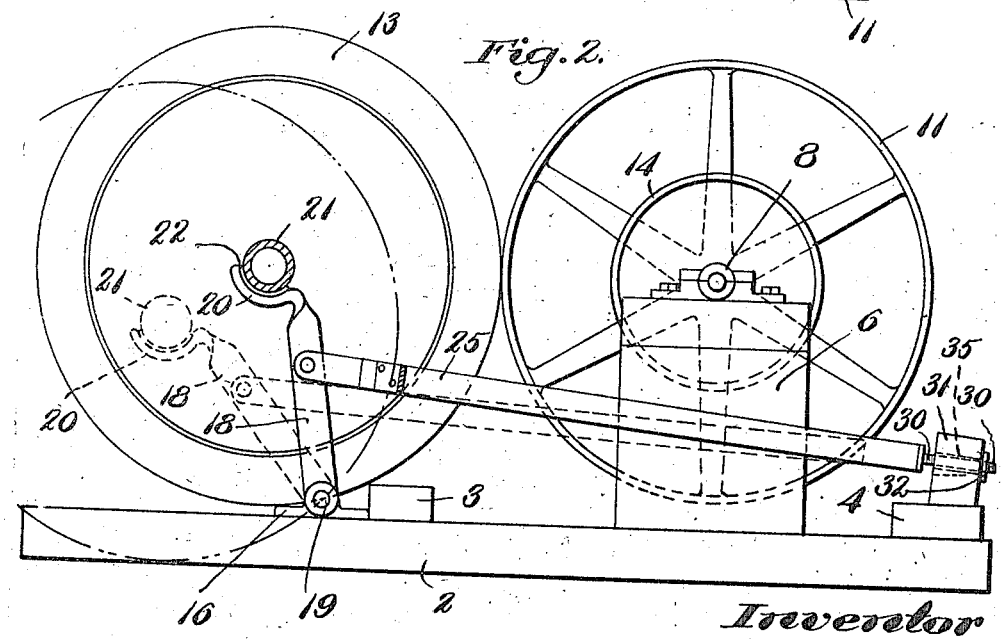
Fig. 2 is a side view, eliminating the auto springs, running body, etc.

Pivotal plates to the frames 1 and 2 are provided at 15 and 16, to which are secured arms 17 and 18 by pins 19. Each arm 18, which is preferably made of bar iron or steel, has its upper portion hammered round into a rest 20 adapted to fit beneath the rear axle 21 of the automobile on which the wheels 12 and 13 are mounted. A leather pad 22 may be fitted to the portion 20 in each arm so as not to scar the finish on the automobile axle 21. The arms 18 are adapted to be tilted forwardly, as shown in dotted line position, Fig. 2, so as to be lowered sufficiently for the automobile axle 21 to be rolled thereover, with the wheel or tire portions resting on the ground. The arms 18 are then simultaneously rocked on their pivots and engage, lift, and force the rear axle 21 toward the pulleys 10 and 11, simultaneously raising and moving the peripheral surfaces of the wheels 12 and 13 toward the pulleys 10 and 11, until a desired driving and non-slipping friction is secured. To accomplish this result, I provide a pair of iron straps 24 and 25, pivoting the same at 26, 26, to each arm 18, and leading said straps rearwardly to be joined at a point 27 to a block 28. The straps and block may be welded, riveted, or otherwise secured together, and the block 28 is threaded to receive a correspondingly threaded screw 30. This screw 30 leads through a brace 31 mounted on a crossbar 4 bolted to the side supports 1 and 2. On the face of the brace 31 is a metal plate 32 threaded to receive the screw 30, which latter carries a crank 33 and handle 34 on its outermost end. Manipulation of the crank 33 moves the straps 24 and 25 toward and from the members 31, thereby rocking the arms 18 on their pivots 19 and simultaneously lifting and forcing the wheels 12 and 13 against the transmission pulleys 10 and 11. Rotation of the motor imparts rotary movement through the wheels 12 and 13, pulleys 10 and 11, and belt pulley 14 to the desired machinery, as will be readily understood. The slight oscillation between the arms 24 and 25 vertically during the rocking of the arms 18, is easily taken up by the plate 32, sufficient play being found between the coarse threads of as heavy and powerful a screw as that used, as indicated at 30, for such limited play, as is necessary. The board recess through the brace 31 indicated at 35 is of sufficiently greater diameter than the screw 30 to readily permit of such oscillations directly from the plate 32.

My apparatus is extremely simple, light, strong and efficient and can be readily transported to any place, being in fact capable of being loaded on board an ordinary small automobile, carried to a place of use, at once set up on the ground, and the automobile rolled over the catches 20 and instantly and simultaneously lifted and forced against the pulleys with a desired driving friction, irrespective of the weight of the rear wheels and the automobile, and the apparatus is ready for use. Should any slippage occur between the auto wheels and the drive pulleys, a further tightening of the screw 30 corrects same.

My invention is further described in the form of a claim as follows:

Apparatus of the kind described, adapted to receive and transmit power from the rear wheels of an automobile, comprising a frame, a pair of pulleys rotatably mounted on said frame, a pair of vertically extending pivoted arms, adapted to fit under the rear axle of an automobile while the driving wheels are resting on the ground, a pair of straps extending from each pivoted arm to a single screw bearing arranged centrally of the frame, and means to rotate said screw to move both said straps and rock each arm, simultaneously lifting the axle, freeing the wheels from the ground and forcing their peripheries against the pulleys by the single rotative action of said central screw, automatically equalizing the driving friction between both wheels and their respective pulleys.

In testimony whereof, I have signed my name to this specification, in the presence of two subscribing witnesses.

ROBERT W. ROSE

Witnesses:
HAROLD G. CLARK,
DUNCAN L. MACINTYRE.